United States Patent
Ransom et al.

(10) Patent No.: US 7,995,504 B2
(45) Date of Patent: Aug. 9, 2011

(54) LOCALITY-BASED ROUTING TABLE GENERATION

(75) Inventors: Kevin Ransom, Duvall, WA (US); Sandeep Singhal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 266 days.

(21) Appl. No.: 12/119,346

(22) Filed: May 12, 2008

(65) Prior Publication Data
US 2009/0279437 A1    Nov. 12, 2009

(51) Int. Cl.
H04B 1/56    (2006.01)
(52) U.S. Cl. ........................................ 370/272
(58) Field of Classification Search .................. None
See application file for complete search history.

(56) References Cited

U.S. PATENT DOCUMENTS

| | | | |
|---|---|---|---|
| 6,266,706 | B1 | 7/2001 | Brodnik et al. |
| 7,031,288 | B2 * | 4/2006 | Ogier ........................ 370/338 |
| 7,054,867 | B2 | 5/2006 | Bosley et al. |
| 7,146,371 | B2 | 12/2006 | Hofstee et al. |
| 7,269,174 | B2 | 9/2007 | Olson et al. |
| 7,369,560 | B2 * | 5/2008 | Le Pennec et al. ...... 370/395.52 |
| 7,454,519 | B2 * | 11/2008 | Smith et al. .................. 709/238 |
| 7,583,661 | B2 * | 9/2009 | Chaudhuri .................. 370/353 |
| 7,616,574 | B2 * | 11/2009 | Previdi et al. ................ 370/238 |
| 2003/0086425 | A1 * | 5/2003 | Bearden et al. .............. 370/392 |
| 2005/0063318 | A1 * | 3/2005 | Xu et al. ...................... 370/254 |
| 2005/0076137 | A1 | 4/2005 | Tang et al. |
| 2005/0108371 | A1 | 5/2005 | Manion et al. |
| 2005/0195815 | A1 * | 9/2005 | Chaudhuri .................. 370/389 |
| 2006/0034193 | A1 * | 2/2006 | Shi et al. ..................... 370/255 |
| 2007/0002869 | A1 | 1/2007 | Miller |
| 2007/0025346 | A1 * | 2/2007 | Kecskemeti ................. 370/389 |
| 2007/0280199 | A1 * | 12/2007 | Rong ........................... 370/351 |
| 2008/0008105 | A1 * | 1/2008 | Black et al. .................. 370/260 |

FOREIGN PATENT DOCUMENTS

WO    99/60459 A2    11/1999

OTHER PUBLICATIONS

"Artemis Deliverable D3.1.1.3: Review of the State-of-the-Art—Peer-to-Peer Networks and Architectures", IST-2103 STP Artemis, Apr. 7, 2004, 24 pgs., http://www.srdc.metu.edu.tr/webpage/projects/artemis/documents/D3.1.1.3-SOAv1.1_P2P-2.doc.

(Continued)

Primary Examiner — Chi H Pham
Assistant Examiner — Fan Ng

(57) ABSTRACT

Systems and methods storage of adding a node entry to a routing table of an inquiring node of a data network are disclosed herein. An inquire message is transmitted to a publishing node. The publishing node can be configured to publish a routing entry which can be added by nodes of a network. An acknowledgment response can be received from the publishing node. The roundtrip time elapsed between transmitting the inquire message and receiving the response can be measured by the inquiring node. For all node registration entries in the routing table of the inquiring node a determination of whether the inquiring node is closest in locality to the publishing node than to a node corresponding to each node registration entry can be performed. Such determination can be made based on (a) the roundtrip time between nodes (b) node IP address prefix matching.

20 Claims, 5 Drawing Sheets

OTHER PUBLICATIONS

"Improving Application-level Network Services with Regions", Ji Li, May 2003, 81 pgs., http://www.lcs.mit.edu/publications/pubs/pdf/MIT-LS-TR-897.pdf.

"Pastry: Scalable, decentralized object location and routing for large-scale peer-to-peer systems", Antony Rowstron and Peter Druschel, appears on Proc. of the 18th IFIP/ACM International Conference on Distributed Systems Platforms, Nov. 2001, 22 pgs. http://research.microsoft.com/~antr/PAST/pastry.pdf.

"Geographic Locality of IP Prefixes", Michael J. Freedman, Mythili Vutukuru, Nick Feamster and Hari Balakrishnan, 6 pgs., http://www.mit.edu/~mythili/research/imc05.ps.

* cited by examiner

LOCALITY-BASED ROUTING TABLE GENERATION

BACKGROUND

Efficient communication between nodes in a peer-to-peer network relies on effective routing algorithms and fast data processing. Peer-to-peer overlays provide a flexible approach for connecting multiple nodes in a communications network. Peer-to-peer applications can be for example content distribution networks or peer-to-peer file sharing and archiving. Individual nodes represent hardware and/or software components that support a shared communications protocol to allow communications among the nodes. Traditional routing systems are not well suited to a world in which nodes are increasingly geographically disperse. As nodes in a network become routing transports of data, unnecessarily routing data through geographically distant nodes can be inefficient and costly.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Described herein are various techniques and technologies directed to building a routing table of a routing node such that the routing table includes nodes that are best transport options. Nodes that are closest to the routing node in locality are preferred. As disclosed herein, in considering between two nodes having a significant difference in roundtrip time, the node having the lowest round trip time can be chosen. However, between two nodes not having a significant difference in roundtrip time to the local node, an IP addressed based computation can be used to determine which node is closest in locality to the routing node. A threshold can be implemented to differentiate nodes that have a significant difference in roundtrip time.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented as a system for managing preferred items lists in the context of products, it is also contemplated the a preferred item may be a service that the consumer wants to receive. As such, the system described is provided as an example and not a limitation. As those skilled in the art will appreciate, the present examples are suitable for application in a variety of different types of preferred items list management.

Described herein are various techniques and technologies directed toward an implementation of the generation of a routing table for a routing instance, such as network node. Current routing algorithms maintain routing tables in a cache view for each local registration. The routing table contains a collection of pointers to node registration entries. When the routing algorithm encounters a new neighbor that it could add to the routing table, the new neighbor needs to be analyzed in comparison with the existing entries of the routing table. The new neighbor is referred to herein as a publishing node that publishes its new presence and data on the data network. As disclosed herein, the routing table can be generated using various factors such as the numeric value of the node keys, relative trust level of each node (e.g. was the node authenticated before being added), message round trip time between the local node and the new neighbor being considered, and the geographical proximity of the nodes. In one aspect, IP prefix length matching can be utilized to determine better locality. As such, node registration entries which have the greatest number of bits in common with the local node are preferred.

Figure 1:
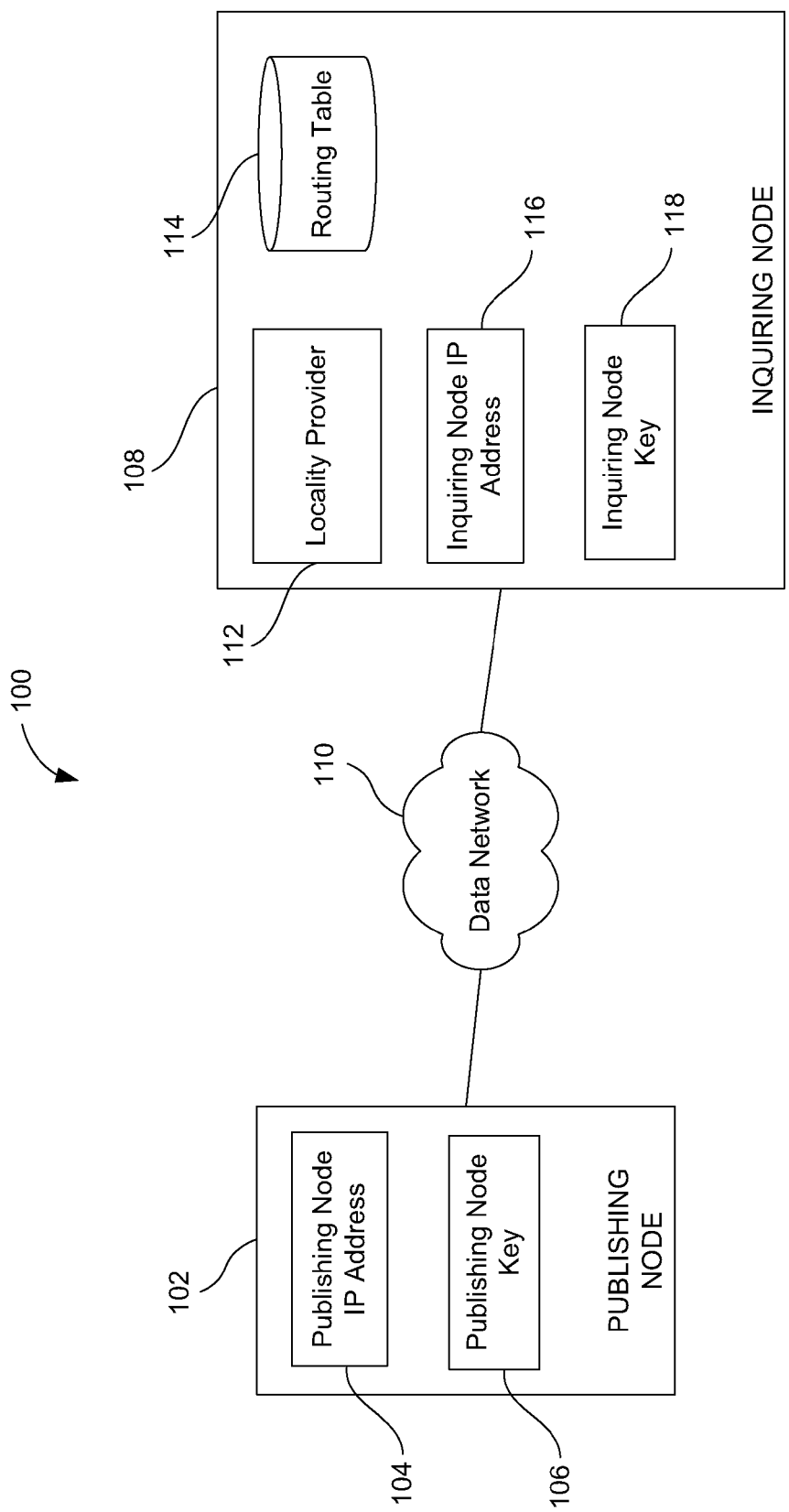
FIG. 1 illustrates a component diagram of a system for generating a locality-based routing table according to one embodiment.

FIG. 1 illustrates a component diagram of a system for generating a locality-based routing table according to one embodiment. A publishing node 102 can include a node IP address 104 and a node key 106. An inquiring node 108 can include a node IP address 116 and a node key 118, a locality provider 112 and a routing table 114. The data network 110 can be an intranet, subnet, the Internet, or any other now known, or to become known, type of data network.

The inquiring node 108 can be a node that serves as a data transport in data network. As such, the inquiring node 108 can be any routing node that continuously refines its routing table 114 to provide effective data routing. During normal operation, the publishing node 102 broadcasts information about the availability of the publishing node 102 to be a potential endpoint or routing node that can be added to routing tables of other nodes in the data network 110. As such, the inquiring node 108 can receive the broadcasted message from the publishing node 102.

As disclosed herein, the inquiring node 108 can make a decision to add an entry corresponding the publishing node 102 to the routing table 114 based on the locality of the publishing node 102. Thus, if the entries already in existence in the routing table 114 provide better routing locality than the information about the publishing node 102, then the inquiring node 108 may not add an entry for the publishing node 102. In other words, if the publishing node 102 is close in locality to the inquiring node, the publishing node 102 may be a good substitution or addition to the routing table 114.

In one embodiment, the inquiring node 108 is configured with a locality provider 112. The locality provider 112 can be utilized by the inquiring node to analyze the locality of the publishing node 102 in comparison with the locality of the node registration entries in the routing table 114. In one embodiment, the locality provider 112 can be a software module that can be separately installed on any data network node.

The inquiring node 108 can transmit an inquire message to a publishing node. The inquire message can include a request for information regarding the publishing node 102. In addition, the inquire message can be transmitted from the inquiring node 108 in response to a published routing entry which can be added by nodes of the data network. The inquiring node 108 can then receive an acknowledgment response from the publishing node 102. In one embodiment, the acknowledgement response can include security credentials.

The inquiring node 108 can further be configured to measure a roundtrip time that elapsed between transmitting the inquire message and receiving the response. In addition, the inquiring node 108 can traverse the routing table 114 in order to analyze the node registration entries that the routing table 114 contains.

In one embodiment, the locality provider 112 can be configured to analyze the routing table 114 and the candidate entry, namely an entry representative of the publishing node 102. The locality provider 112 can calculate a roundtrip time difference between the roundtrip time for the publishing node as was previously calculated and an entry node roundtrip time. The entry node roundtrip time can be predetermined to be the time elapsed between transmitting a message and receiving a response to the message between the node corresponding to each node registration entry and the inquiring node 108. In one embodiment, the entry node roundtrip time can be previously determined and stored by the inquiring node 108 in association with each entry of the routing table. In another embodiment, the entry node roundtrip time can be determined at run-time.

The roundtrip time difference can then be used by the locality provider 112. In one example, the locality provider 112 can be configured to determine whether the roundtrip times to the publishing node 102 and to the node in the routing table 114 are so disparate that one node must be much closer than the other node. Therefore, it is determined whether the roundtrip time difference is above a predetermined threshold. In one example, the threshold can be established by a system administrator.

If the difference is above the threshold, then the one node is much closer to the inquiring node 108 than the other node being compared. In this case, the locality provider 112 can simply select the node that has the lowest roundtrip time. Thus, the publishing node 102 is selected to be closest in locality to the inquiring node 108 if the roundtrip time is lower than the entry node roundtrip time. Further, the node corresponding to the node registration entry can be selected to be closest in locality to the inquiring node 108 if the roundtrip time is lower than the entry node roundtrip time.

If the difference is not above the threshold, or below the threshold, then the nodes being compared are closer to each other, and their distance to the inquiring node 108 may be similar. In this case, the locality provider 112 can select the node that is the longest common prefix-matching node to be closest in locality to the inquiring node 108.

Prefix Matching

In one embodiment, the locality provider 112 can be configured to determine locality based on known or to become known prefix matching algorithms. As such, the nodes closest in locality to the inquiring node 108 can be selected based on longest common prefix matching of IP addresses or another identifier.

In one embodiment, the publishing node IP address 104 is obtained and extracted from the publishing node 102. In addition, an entry node IP address for the node corresponding to each node registration entry can also be extracted.

Various known extraction algorithms can be used for the publishing node IP address 104 and the entry node IP addresses. Thus, such techniques can be used in order to obtain and format the IP address to a common format in which the IP addresses can be compared. In one example, all IP addresses can be formatted to an IPv6 format. In another example, all IP addresses can be formatted to an IPv4 format. Various type formats can be found in nodes of a network, such as addresses having a type format Teredo, 6 to 4, or ISATAP, among others. Thus, for example, IPv4 addresses from Teredo, ISATAP and 6 to 4 can be mapped to IPv6 addresses.

A publishing node prefix match number and an entry node prefix match number can be calculated. The publishing node prefix match number can be representative of the number of prefix bits that match the inquiring node IP address 116 and the publishing node IP address 104. The entry node prefix match number can be representative of the number of prefix bits that match the inquiring node IP address 116 and the entry node IP address. Thus, whichever comparison yields the higher number of matching bits can be indicative of the node that is closest in IP address matching, and therefore in locality. Therefore, the publishing node 102 can be selected to be the longest common prefix matching node if the publishing node prefix match number is greater than the entry node prefix match number. Likewise, the node corresponding to the node registration entry can be selected to be the longest common prefix matching node if the entry node prefix match number is greater than the publishing node prefix match number.

Furthermore, if the entry node prefix match number is equal to the publishing node prefix match number various embodiments are available. In one embodiment, the node corresponding to each node registration entry to be closest in locality to the inquiring node is selected. In other words, the entry previously existing on the table can be retained. In another embodiment, the node with the lowest roundtrip time can be selected. For instance, the publishing node 102 can be selected to be closest in locality to the inquiring node 108 if the roundtrip time to the publishing node 102 is lower than the entry node roundtrip time of the node corresponding to the node registration entry of the outing table 114. In another example, the node corresponding to the node registration entry is selected to be closest in locality to the inquiring node 108 if the entry roundtrip time is lower than the roundtrip time of the publishing node 102.

In a further embodiment, a scenario where either the roundtrip time or the entry node roundtrip time is zero it can be determined whether the publishing node or the node corresponding to the node registration entry is closest in locality to the inquiring node based on the numerical proximity of the node keys. For example, if the publishing node key 106 is more numerically close to the inquiring node key 118, then the publishing node 102 can be determined to be closest in locality to the inquiring node 108. Further, if the key corresponding to the node registration entry, such as the node registration entry key, is more numerically close to the inquiring node key 118, then the node corresponding to the node registration entry can be determined to be closest in locality to the inquiring node 108. Numerical proximity can be calculated using the difference of two numbers. The lower the difference, closer the two numbers are to each other.

Figure 2:
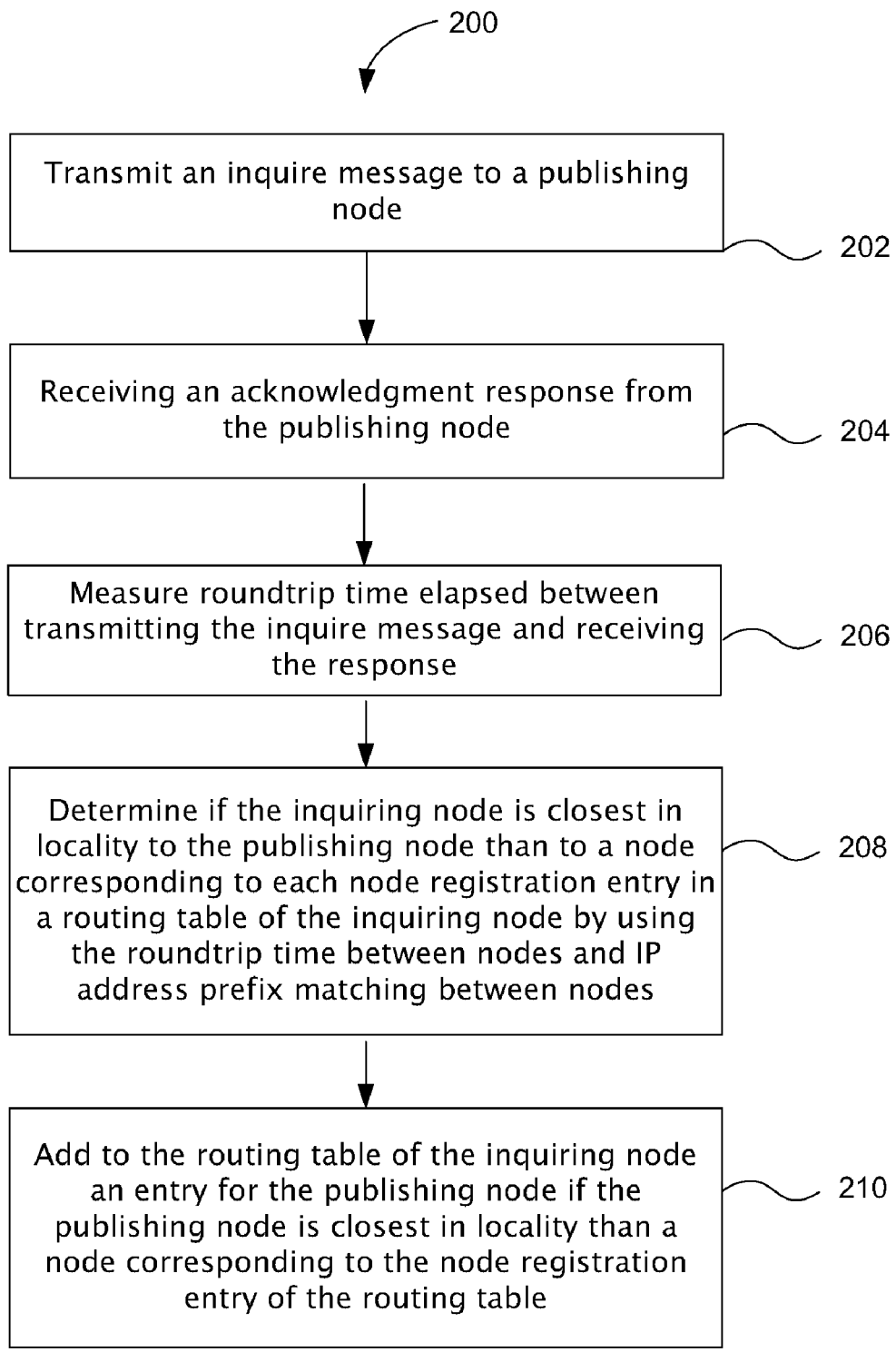
FIG. 2 illustrates a flow diagram of a process for determining the node closest in locality to the inquiring node according to one embodiment.

FIG. 2 illustrates a flow diagram of a process 200 for determining the node closest in locality to the inquiring node according to one embodiment. At process block 202, an inquire message is transmitted to a publishing node. The publishing node can be configured to publish a routing entry which can be added by nodes of a network. Process 200 continues at process block 204. At process block 204, receiving an acknowledgment response is received from the publishing node. Process 200 continues at process block 206.

At process block 206, a roundtrip time that elapsed between transmitting the inquire message and receiving the response is measured. Process 200 continues at process block 208. At process block 208, for all node registration entries in the routing table, it is determined whether the inquiring node is closest in locality to the publishing node than to a node corresponding to each node registration entry. Such determination can be performed using the roundtrip time between the inquiring node and both the node corresponding to each node registration entry and the publishing node. In addition, such determination can further be supplemented by performing IP address prefix matching of the inquiring node and both the node corresponding to each node registration entry and the publishing node. Process 200 continues at process block 210. At process block 210, an entry for the publishing node is added to the routing table if it is determined that the publishing node is closest in locality than the node corresponding to the node registration entry.

Figure 3:
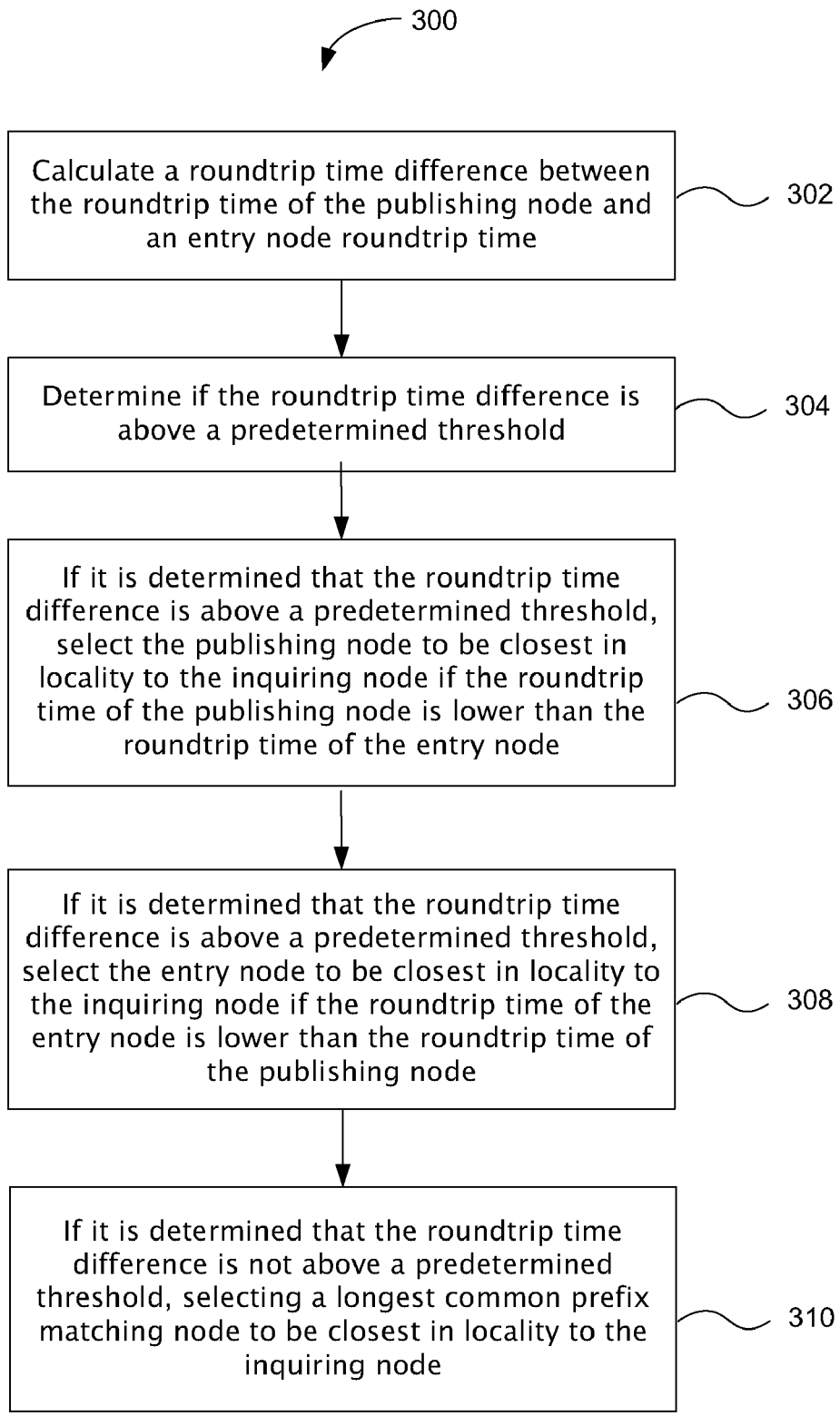
FIG. 3 illustrates a flow diagram of a process for determining the longest common prefix matching node according to one embodiment.

FIG. 3 illustrates a flow diagram of a process 300 for determining the longest common prefix-matching node according to one embodiment. At process block 302, a roundtrip time difference between the roundtrip time and an entry node roundtrip time is calculated. The entry node roundtrip time can be the time elapsed between transmitting a message and receiving a response to the message between the node corresponding to each node registration entry and the inquiring node. Process 300 continues at process block 304. At process block 304, it is determined if the roundtrip time difference is above a predetermined threshold. Process 300 continues at process block 306.

At process block 306, if it is determined that the roundtrip time difference is above a predetermined threshold, and if the roundtrip time is lower than the entry node roundtrip time, the publishing node is selected to be closest in locality to the inquiring node. Process 300 continues at process block 308.

At process block 308, if it is determined that the roundtrip time difference is above a predetermined threshold, and if the entry node roundtrip time is lower than the roundtrip time, the node corresponding to the node registration entry is selected to be closest in locality to the inquiring node. Process 300 continues at process block 310.

At process block 310, if it is determined that the roundtrip time difference is not above a predetermined threshold, a longest common prefix matching node is selected to be closest in locality to the inquiring node.

Figure 4:
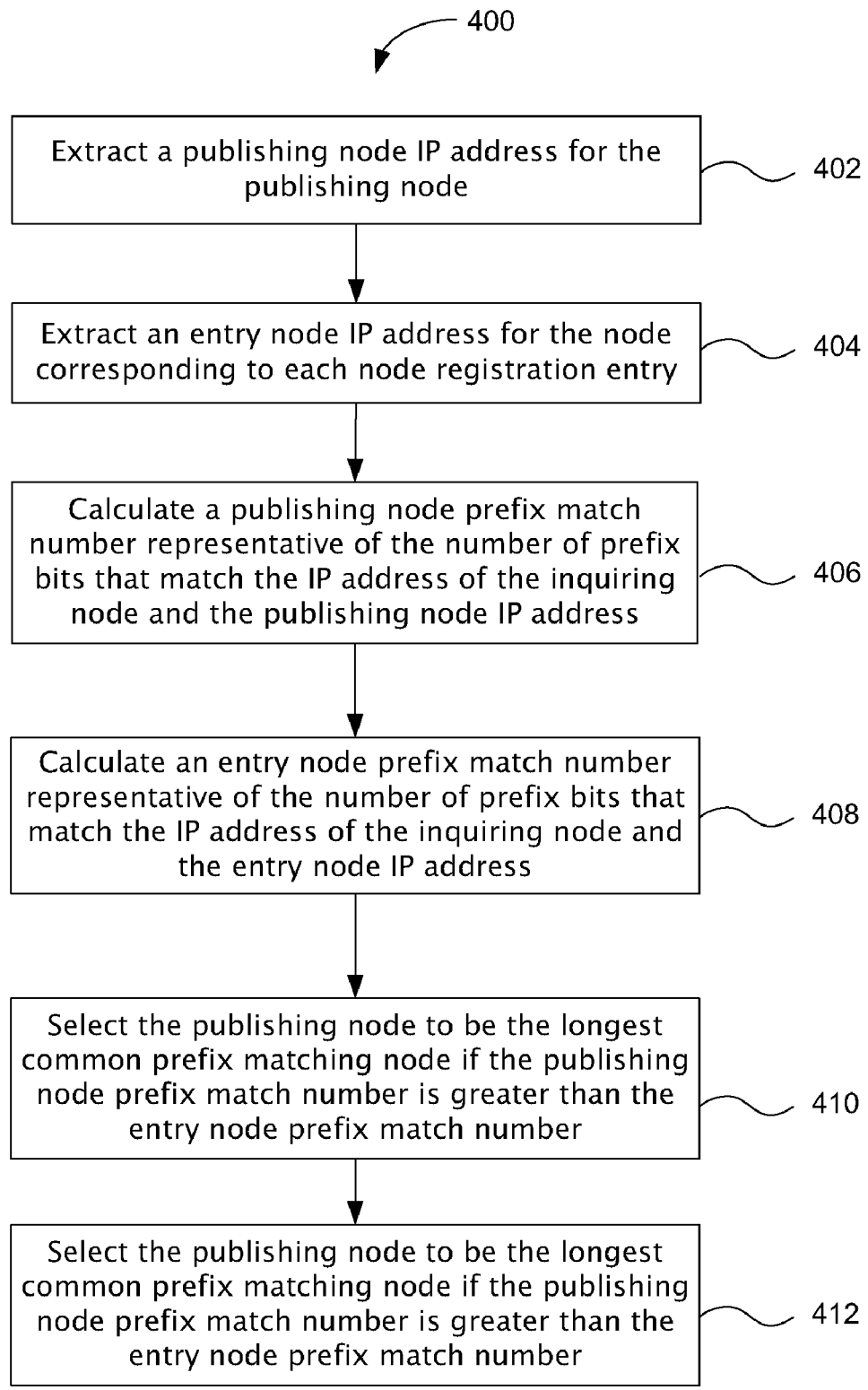
FIG. 4 illustrates a flow diagram of a process for comparing node trust levels according to one embodiment.

FIG. 4 illustrates a flow diagram of a process 400 for comparing node trust levels according to one embodiment. At process block 402, an entry node trust level is compared with a publishing node trust level. Process 400 continues at process block 404. At process block 404, if the entry node trust level is higher than the publishing node trust level, the current node registration entry is retained. Process 400 continues at process block 406. At process block 406, if the publishing node trust level is higher than the entry node trust level, the node registration entry is replaced with a publishing node entry. Process 400 continues at process block 408. At process block 408, it is determined if the inquiring node is closest in locality to the publishing node than to the node corresponding to each node registration entry if the publishing node trust level is equal to the entry node trust level.

Figure 5:
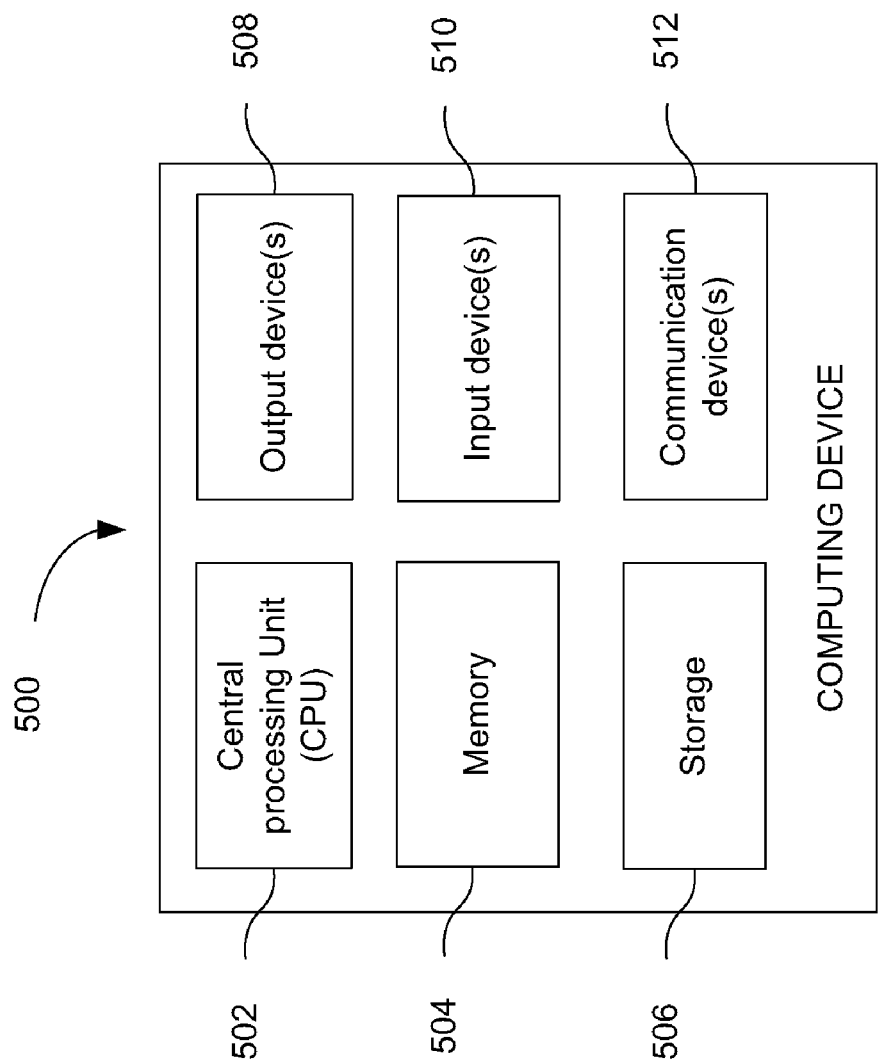
FIG. 5 illustrates a component diagram of a computing device for implementing one or more embodiments.

FIG. 5 illustrates a component diagram of a computing device according to one embodiment. The computing device 500 can be utilized to implement one or more computing devices, computer processes, or software modules described herein. In one example, the computing device 500 can be utilized to process calculations, execute instructions, receive and transmit digital signals. In another example, the computing device 500 can be utilized to process calculations, execute instructions, receive and transmit digital signals, receive and transmit search queries, and hypertext, compile computer code, as required by the consumer inquiring node 108, the publishing node 102, or the locality provider 112.

The computing device 500 can be any general or special purpose computer now known or to become known capable of performing the steps and/or performing the functions described herein, either in software, hardware, firmware, or a combination thereof.

In its most basic configuration, computing device 500 typically includes at least one central processing unit (CPU) 502 and memory 504. Depending on the exact configuration and type of computing device, memory 504 may be volatile (such as RAM), non-volatile (such as ROM, flash memory, etc.) or some combination of the two. Additionally, computing device 500 may also have additional features/functionality. For example, computing device 500 may include multiple CPU's. The described methods may be executed in any manner by any processing unit in computing device 500. For example, the described process may be executed by both multiple CPU's in parallel.

Computing device 500 may also include additional storage (removable and/or non-removable) including, but not limited to, magnetic or optical disks or tape. Such additional storage is illustrated in FIG. 5 by storage 506. Computer storage media includes volatile and nonvolatile, removable and non-removable media implemented in any method or technology for storage of information such as computer readable instructions, data structures, program modules or other data. Memory 504 and storage 506 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 500. Any such computer storage media may be part of computing device 500.

Computing device 500 may also contain communications device(s) 512 that allow the device to communicate with other devices. Communications device(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 500 may also have input device(s) 510 such as keyboard, mouse, pen, voice input device, touch input device, etc. Output device(s) 508 such as a display, speakers, printer, etc. may also be included. All these devices are well known in the art and need not be discussed at length.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A computer-implemented method of adding a node entry to a routing table of an inquiring node of a data network, comprising:
    transmitting an inquire message from the inquiring node to a publishing node, the publishing node configured to publish a routing entry;
    receiving an acknowledgment response from the publishing node;
    measuring a publishing node roundtrip time, the publishing node roundtrip time is a time that elapsed between transmitting the inquire message and receiving the acknowledgement response; and
    for respective node registration entries in the routing table,
        determining if the inquiring node is closer in locality to the publishing node or to a node having a corresponding entry in the routing table by calculating a roundtrip time difference between the publishing node roundtrip time and a node roundtrip time, the node roundtrip time is the time elapsed between transmitting an inquire message from the inquiring node to the node and receiving an acknowledgement response from the node back at the inquiring node, and using IP address prefix matching for the inquiring node and the publishing node and IP address prefix matching for the inquiring node and the node;
        if it is determined that the roundtrip time difference is above a predetermined threshold, selecting the publishing node to be closer in locality to the inquiring node if the publishing node roundtrip time is lower than the node roundtrip time, and selecting the node to be closer in locality to the inquiring node if the node roundtrip time is lower than the publishing node roundtrip time; and
        adding to the routing table an entry for the publishing node if the publishing node is selected.

2. The method of claim 1, the node roundtrip time previously determined and stored in the routing table.

3. The method of claim 1, comprising:
    if it is determined that the roundtrip time difference is not above a predetermined threshold, selecting a longest common prefix matching node to be closer in locality to the inquiring node.

4. The method of claim 3, the longest common prefix matching node selected by:
    extracting a publishing node IP address for the publishing node;
    extracting a node IP address for the node having a corresponding entry in the routing table;
    calculating a publishing node prefix match number representative of a number of prefix bits that match an inquiring node IP address and the publishing node IP address;
    calculating a node prefix match number representative of the number of prefix bits that match the inquiring node IP address and the node IP address;
    selecting the publishing node to be the longest common prefix matching node if the publishing node prefix match number is greater than the node prefix match number; and
    selecting the node having a corresponding entry in the routing table to be the longest common prefix matching node if the node prefix match number is greater than the publishing node prefix match number.

5. The method of claim 4, comprising selecting the node having a corresponding entry in the routing table to be closer in locality to the inquiring node if the node prefix match number is equal to the publishing node prefix match number.

6. The method of claim 4, comprising if the node prefix match number is equal to the publishing node prefix match number, selecting the publishing node to be closer in locality to the inquiring node if the publishing node roundtrip time is lower than the node roundtrip time, and selecting the node having a corresponding entry in the routing table to be closer in locality to the inquiring node if the node roundtrip time is lower than the publishing node roundtrip time.

7. The method of claim 6, if either the publishing node roundtrip time or the node roundtrip time is zero, determining whether the publishing node or the node having a corresponding entry in the routing table is closer in locality to the inquiring node based on a numerical proximity between a publishing node key and an inquiring node key, and a numerical proximity between a node registration entry key and the inquiring node key.

8. The method of claim 4, extracting the publishing node IP address and the node IP address comprising extracting the address from an address having a type format that is Teredo, 6 to 4, or ISATAP.

9. The method of claim 1, the response from the publishing node comprising an authority message comprising credential information to validate the publishing node.

10. The method of claim 9, comprising:
    comparing a node trust level with a publishing node trust level;
    if the node trust level is higher than the publishing node trust level, retaining the node registration entry;
    if the publishing node trust level is higher than the node trust level, replacing the node registration entry with a publishing node entry; and
    if the publishing node trust level is equal to the node trust level, determining if the inquiring node is closer in locality to the publishing node than to the node having a corresponding entry in the routing table.

11. A non-signal computer readable storage device configured with instructions such that when executed permit a programmed computer to add a node entry to a routing table of an inquiring node of a data network, the instructions comprising:
    transmitting an inquire message from the inquiring node to a publishing node, the publishing node configured to publish a routing entry;

receiving an acknowledgment response from the publishing node;

measuring a publishing node roundtrip time, the publishing node roundtrip time is a time that elapsed between transmitting the inquire message and receiving the acknowledgement response; and for respective node registration entries in the routing table,
calculating a roundtrip time difference between the publishing node roundtrip time and a node roundtrip time, the node roundtrip time is the time elapsed between transmitting an inquire message from the inquiring node to a node having a corresponding entry in the routing table and receiving an acknowledgement response back at the inquiring node;

if it is determined that the roundtrip time difference is above a predetermined threshold, selecting the publishing node to be closer in locality to the inquiring node if the publishing node roundtrip time is lower than the node roundtrip time, and selecting the node to be closer in locality to the inquiring node if the node roundtrip time is lower than the publishing node roundtrip time; and if it is determined that the roundtrip time difference is not above a predetermined threshold, selecting a longest common prefix matching node to be closer in locality to the inquiring node.

12. The non-signal computer readable storage device of claim 11, the longest common prefix matching node determined by:
extracting a publishing node IP address for the publishing node;
extracting an node IP address for the node having a corresponding entry in the routing table;
calculating a publishing node prefix match number representative of a number of prefix bits that match an inquiring node IP address and the publishing node IP address;
calculating a node prefix match number representative of the number of prefix bits that match an inquiring node IP address and the node IP address;
selecting the publishing node to be the longest common prefix matching node if the publishing node prefix match number is greater than the node prefix match number; and
selecting the node having a corresponding entry in the routing table to be the longest common prefix matching node if the node prefix match number is greater than the publishing node prefix match number.

13. The non-signal computer readable storage device of claim 12, comprising if the node prefix match number is equal to the publishing node prefix match number, selecting the publishing node to be closer in locality to the inquiring node if the publishing node roundtrip time is lower than the node roundtrip time, and selecting the node having a corresponding entry in the routing table to be closer in locality to the inquiring node if the node roundtrip time is lower than the publishing node roundtrip time.

14. The non-signal computer readable storage device of claim 12, comprising selecting the node having a corresponding entry in the routing table to be closer in locality to the inquiring node if the node prefix match number is equal to the publishing node prefix match number.

15. The non-signal computer readable storage device of claim 14, if either the publishing node roundtrip time or the node roundtrip time is zero, determining whether the publishing node or the node having a corresponding entry in the routing table is closer in locality to the inquiring node based on a numerical proximity between a publishing node key and an inquiring node key, and a numerical proximity between a node registration entry key and the inquiring node key.

16. The non-signal computer readable storage device of claim 11, the node roundtrip time previously determined and stored in the routing table.

17. The non-signal computer readable storage device of claim 11, the response from the publishing node comprising an authority message comprising credential information to validate the publishing node.

18. The non-signal computer readable storage device of claim 17, comprising:
comparing a node trust level with a publishing node trust level;
if the node trust level is higher than the publishing node trust level, retaining the node registration entry;
if the publishing node trust level is higher than the node trust level, replacing the node registration entry with a publishing node entry; and
if the publishing node trust level is equal to the node trust level, determining if the inquiring node is closer in locality to the publishing node than to the node having a corresponding entry in the routing table.

19. A computer-implemented method of adding a node entry to a routing table of an inquiring node of a data network, comprising:
for respective node registration entries in the routing table,
determining if the inquiring node is closer in locality to a publishing node, the publishing node configured to publish a routing entry, or a node having a corresponding entry in the routing table by calculating a roundtrip time difference between a publishing node roundtrip time, the publishing node roundtrip time is the time elapsed between transmitting an inquire message from the inquiring node to the publishing node and receiving an acknowledgement response from the publishing node, and a node roundtrip time, the node roundtrip time is the time elapsed between transmitting an inquire message from the inquiring node to the node and receiving an acknowledgement response from the node back at the inquiring node, and using IP address prefix matching for the inquiring node and the publishing node and IP address prefix matching for the inquiring node and the node;
if it is determined that the roundtrip time difference is above a predetermined threshold, selecting the publishing node to be closer in locality to the inquiring node if the publishing node roundtrip time is lower that the node roundtrip time, and selecting the node having a corresponding entry in the routing table to be closer in locality to the inquiring node if the node roundtrip time is lower than the publishing node roundtrip time; and
adding to the routing table an entry for the publishing node if the publishing node is selected.

20. The method of claim 19, the response from the publishing node comprising an authority message comprising credential information to validate the publishing node.

* * * * *